US005832697A

United States Patent [19]

Rogers

[11] Patent Number: 5,832,697

[45] Date of Patent: Nov. 10, 1998

+

[54] METHOD AND APPARATUS FOR COOLING FILLED POUCHES

[75] Inventor: Kent L. Rogers, Grove City, Ohio

[73] Assignee: Cryovac, Inc., Duncan, S.C.

[21] Appl. No.: 665,073

[22] Filed: Jun. 11, 1996

Related U.S. Application Data

[60] Provisional application No. 60/005,793, Oct. 23, 1995.

[51] Int. Cl.[6] .......... B65B 55/14

[52] U.S. Cl. .......... 53/440; 53/127; 426/524; 426/393

[58] Field of Search .......... 53/127, 440; 62/60, 62/64, 65; 426/524, 393

[56] References Cited

U.S. PATENT DOCUMENTS

| | | | |
|---|---|---|---|
| 1,965,624 | 7/1934 | Young | 62/60 |
| 3,469,363 | 9/1969 | Berckmoes | 53/440 |
| 3,832,825 | 9/1974 | Dunbar | 53/440 |
| 3,987,602 | 10/1976 | Stahl | 53/440 |
| 4,120,984 | 10/1978 | Richardson et al. | 53/440 |
| 4,218,486 | 8/1980 | Bieler et al. | 53/127 |
| 4,356,681 | 11/1982 | Barnes | 53/440 |
| 4,380,908 | 4/1983 | Crabb, Jr. | 426/524 |
| 4,478,861 | 10/1984 | Montgomery et al. | 426/393 |

*Primary Examiner*—James F. Coan
*Assistant Examiner*—Gene L. Kim
*Attorney, Agent, or Firm*—Mark B. Quatt

[57] ABSTRACT

A method comprises transferring a plurality of pouches, the pouches containing a product having a temperature of between 100° F. and 212° F., to a tumbler chiller having refrigerated water as the cooling medium; tumbling and cooling the pouches until the temperature of the product drops to between 50° F. and 70° F.; transferring the cooled pouches to a cooling bath using a liquid cooling medium having a temperature lower than 32° F.; and moving the pouches through the liquid cooling medium until the product temperature drops to between 30° F. and 50° F. An apparatus comprises a means for transferring a plurality of pouches, the pouches containing a product having a temperature of between 100° F. and 212° F., to a means for tumbling and cooling; a means for tumbling and cooling the pouches until the temperature of the product drops to between 50° F. and 70° F., said means having refrigerated water as the cooling medium; means for transferring cooled pouches to a cooling bath; a cooling bath which uses a liquid cooling medium having a temperature lower than 32° F.; and a means for moving the pouches through the liquid cooling medium until the product temperature drops to between 30° F. and 50° F.

18 Claims, No Drawings

METHOD AND APPARATUS FOR COOLING FILLED POUCHES

This application claims the benefit of U.S. Provisional Application No. 60/005,793, filed Oct. 23, 1995.

FIELD OF THE INVENTION

This invention generally relates to a method and apparatus for cooling filled pouches, especially pouches filled with a food product, and filled in a vertical form/fill/seal (VFFS) process.

BACKGROUND OF THE INVENTION

Vertical form/fill/seal (VFFS) packaging systems have proven to be very useful in packaging a wide variety of flowable or pumpable products. These products include such diverse items as chocolate syrup, spaghetti sauce, mayonnaise, and other food products, and can include non-food products as well. An example of such a system is the Onpack 2000 B pumpable food packaging system sold by W. R. Grace & Co.-Conn. through its Grace Packaging (Cryovac)group. The VFFS process is known to those of skill in the art, and described for example in U.S. Pat. No. 4,589,247 (Tsuruta et al). A flowable or pumpable product is introduced through a central, vertical fill tube to a formed tubular film having been sealed transversely at its lower end, and longitudinally. The pouch is then completed by sealing the upper end of the tubular segment, and severing the pouch from the tubular film above it.

The choice of packaging materials is important, and should be matched to the intended end use of the pouch. For foods such as tomato-based sauces, for example, a laminate of relatively low oxygen transmission is usually required in order to provide extended shelf life for the product. The FS laminates, such as FS 6055B, also sold by W. R. Grace & Co.-Conn. through its Grace Packaging group, are examples of packaging materials suitable for the VFFS process. The FS 6055 B is a high oxygen barrier laminate that offers extended shelf life. It is also a material that is capable of, and in fact often used in commercial applications where the food product is hot filled, typically at 180° F. to 200° F., into the formed pouch during the VFFS process. Thus, this material offers the pumpable food processor both long shelf life and thermal stability for many hot-fill food items. These laminates are described in e.g. U.S. Pat. No. 4,746,562 (Fant).

An alternative laminate is based on Sclair (tm) sealant film, an ethylene/alpha-olefin copolymer marketed by DuPont Canada, and described in e.g. US Pat. No. 4,521,437 (Storms), incorporated herein by reference. A commercial monolayer film from DuPont Canada is FS-3. A commercial multilayer laminate is CL 303.

As indicated above, pouches are sometimes used in connection with VFFS equipment to package hot foods such as soups. These food products are often packaged at temperatures between 170° F. and 185° F., and occasionally approaching 200° F. A filled pouch can weigh several pounds. In a typical packaging environment, using state-of-the-art equipment like the Onpack system, thousands of hot-filled pouches can be produced in a relatively short time. These must be cooled as quickly as possible, to minimize bacterial growth inside the package, and to maximize the product's shelf-life. This is a daunting task when one considers the heat capacity of thousands of pouches filled at hot temperatures, and the fact that each pouch is to be cooled to a temperature of ideally around 40° F.

One common industrial method of cooling a large number of hot filled pouches is the use of a tumbler chiller. As an illustration, filled pouches (packages) are conveyed into a 24 foot continuous drum tumble chiller. There, the pouches are tumbled and chilled for about 25 minutes in refrigerated water having a temperature of about 35° to 38° F. The pouches are then discharged from the chiller.

A controlled tumble chill process using refrigerated water has proven to be an effective method of cooling VFFS heat sealed pouches from hot fill temperatures (e.g. 180° F.) to room temperature (e.g. 60°–65° F.).

Unfortunately, chronic difficulties have been encountered when using tumble chilling as a method of further cooling VFFS heat sealed pouches to a temperature of around 40° F. The root of the difficulty can be found by considering the four corners of what is typically a rectangular pouch. As the product temperature nears the 40° F. target, the corners become stiff and increasingly brittle. The sharp corners then become susceptible to pinholeing during tumbling and agitation of the pouches in the chilled water.

The sharp corners also appear to be responsible for small body punctures of adjacent pouches as the tumbling action continues to bang pouches against one another.

Either of these two phenomena can result in leakers that are commercially unacceptable and must be destroyed.

This is to be contrasted with clipped casings, which are pouches with metal clips at their ends instead of transverse heat seals. An example is a pouch made from the C-300 casing also supplied by Cryovac. Because they do not have the four-corner geometry of filled heat sealed pouches, tumble chilling of clipped casings has proven to be an efficient and economical method of product cooling.

Another disadvantage of such tumble chilling systems has to do with the nature of the cooling medium, and the packaged product itself. Cooling products to 40° F. in water having a temperature of 35° to 38° F. becomes increasingly more difficult as the product temperature nears the cooling water temperature. This difficulty is exacerbated when high viscosity and/or high fat content foods are being packaged. Such products tend to form an insulating coat of cooled product just inside the pouch material, but a relatively warm center at the core or center of the pouch.

Thus, the dilemma facing the food processor is that on the one hand, the use of an agitation system to improve heat transfer results in increased damage to the filled pouches, with a higher incidence of leakers; and on the other hand a reduction in agitation makes it more difficult, and costly, to lower product temperature to the desired end point.

One solution to this problem is to use, instead of the tumble chiller, a large spiral or blast freezer. Both methods use high velocity, sub-zero air to cool the product. These offer an effective alternative, but are very costly in terms of capital investment, and operating cost. They also requires more physical space than a tumble chilling system. For these reasons, they are economically beyond the reach of many small or medium sized food processors. Such systems also are generally not as efficient as cooling in a liquid medium.

Another solution is to pack off and palletize the pouches from the tumble chiller, and immediately move the pallet into a blast freezer to bring the product temperatures down to 40° F. to comply with food safety and quality requirements. This is also costly, and inefficient.

There is therefore a need for an economical, efficient method and apparatus for cooling a filled pouch.

SUMMARY OF THE INVENTION

The invention in one aspect is directed to a method comprising transferring a plurality of pouches, the pouches containing a product having a temperature of between 100° F. and 212° F., to a tumbler chiller having refrigerated water as the cooling medium; tumbling and cooling the pouches until the temperature of the product drops to between 50° F. and 70° F.; transferring the cooled pouches to a cooling bath using a liquid cooling medium having a temperature lower than 32° F.; and moving the pouches through the liquid cooling medium until the product temperature drops to between 30° F. and 50° F.

The invention in another aspect is directed to an apparatus comprising a means for transferring a plurality of pouches, the pouches containing a product having a temperature of between 100° F. and 212° F., to a means for tumbling and cooling; a means for tumbling and cooling the pouches until the temperature of the product drops to between 50° F. and 70° F., said means having refrigerated water as the cooling medium; means for transferring cooled pouches to a cooling bath; a cooling bath which uses a liquid cooling medium having a temperature lower than 32° F.; and a means for moving the pouches through the liquid cooling medium until the product temperature drops to between 30° F. and 50° F.

The pouches preferably are heat sealed pouches, more preferably pouches made in a form/fill/seal apparatus.

The product preferably has a temperature of between 140° F. and 210° F., more preferably between 150° F. and 205° F., even more preferably between 160° F. and 200° F. An especially preferred range for product temperature is between 165° F. and 190° F., and most preferably between 170° F. and 185° F.

The pouches are preferably tumbled and cooled until the temperature of the product drops to between 55° F. and 65° F., more preferably to about 60° F.

The liquid cooling medium having a temperature lower than 32° F. is preferably brine or glycol.

The liquid cooling medium having a temperature lower than 32° F. preferably has a temperature of 30° F. or less, more preferably 25° F. or less, even more preferably 20° F. or less.

The liquid cooling medium having a temperature lower than 32° F. is preferably agitated.

The pouches are moved through the liquid cooling medium until the product temperature drops to preferably between 35° F. and 55° F., more preferably between 38° F. and 52° F., most preferably about 40° F., and especially 40° F.

The means for transferring a plurality of pouches is preferably a conveyor belt or chute.

The means for tumbling and cooling is preferably a drum tumbler/chiller, more preferably a rotary drum tumbler/chiller, most preferably a continuous rotary drum tumbler/chiller.

The means for transferring cooled pouches to a cooling bath is preferably a conveyor belt or chute.

The cooling bath is preferably a continuous cooling bath.

Tumbling of the pouches is preferably stopped before the pouches are transferred to the cooling bath.

DESCRIPTION OF THE PREFERRED EMBODIMENTS

Any conventional tumbler/chiller, such as rotary drum chillers available from Lyco or Baader, is useful in connection with this invention.

Any conventional brine or glycol bath is useful in connection with this invention.

Any conventional means for moving pouches, such as conveyor belts, elevated hangers, chutes, hoppers, etc., are useful in connection with this invention.

The invention can be further understood by reference to the Examples and Tables below.

EXAMPLE 1–7

A plastic tub with a volumetric capacity of between 50 and 60 gallons was used as a brine tank. A section of PVC pipe with a diameter of 0.5 inch was used to construct a system to percolate compressed air from the bottom of the bath. The tank was filled with 280 pounds of water and 40 pounds of salt (sodium chloride). The resulting solution was a 13% salt solution by weight. The final volume of the brine solution occupied 30×20×10 inches of space. The compressed air acted to agitate the brine and ensure uniform brine temperature around each pouch.

seven trials were run, each involving a different pouched product. The products are identified, along with average pouch weight, in Table 1. Before each trial run, the temperature of the brine solution was lowered to around 20° F. by adding dry ice to the brine tank. After the dry ice had each trial run was begun.

TABLE 1

| Example | Product | Weight of Product (pounds) |
|---|---|---|
| 1 | Bean with bacon soup | 8.5 |
| 2 | Beef tip in gravy | 9.0 |
| 3 | Spaghetti sauce with meat | 9.0 |
| 4 | Split Pea with Ham Soup | 8.5 |
| 5 | Chili with meat | 9.0 |
| 6 | Cream of broccoli soup | 8.5 |
| 7 | Cream of broccoli soup (2nd trial) | 8.5 |

At the beginning of each trial, ten packages were taken directly from the exit of a 24 foot Lyco continuous drum tumble chiller. Each package was thoroughly shaken and mixed. An average temperature of the ten pouches was then calculated and recorded as the initial product temperature for the brine chilling. The ten packages were then discarded. The following ten packages out of the Lyco were then placed directly into the brine tank. At five minute intervals, one package was removed from the brine tank. The package was then mixed thoroughly and a product temperature was recorded. That package was then excluded from the remainder of the trial. Once the product had reached 40° F. or lower, the trial was terminated. At the end of each trial, the remaining packages in the brine tank were removed and used to obtain an average product exit temperature.

The results of the seven trials are summarized in Table 2. As an example, "$brine_1$" refers to the temperature of the brine bath used to cool the product of Example 1 (bean with bacon soup) at the various time intervals. "$Product_1$" refers to the temperature of the product of Example 1 (bean with bacon soup) at the various time intervals. Temperatures are in degrees Fahrenheit.

TABLE 2

| Example | Cooling Time (minutes) 0 | 5 | 10 | 15 | 20 | 25 | 30 |
|---|---|---|---|---|---|---|---|
| $brine_1$ | 20.0 | 22.7 | 24.0 | 25.0 | 26.2 | | |
| $product_1$ | 58.1 | 46.2 | 39.6 | 36.9 | 34.2 | | |
| $brine_2$ | 19.3 | 23.6 | 24.2 | 25.8 | 27.3 | 28.0 | |
| $product_2$ | 59.3 | 52.1 | 45.2 | 42.5 | 40.8 | 37.8 | |
| $brine_3$ | 19.0 | 22.5 | 23.7 | 24.5 | 25.3 | 26.2 | 26.7 |
| $product_3$ | 58.1 | 50.8 | 46.9 | 44.4 | 43.2 | 39.8 | 37.7 |
| $brine_4$ | 18.5 | 21.4 | 23.4 | 25.4 | 26.4 | 27.2 | |
| $product_4$ | 63.3 | 53.8 | 44.1 | 42.8 | 40.8 | 40.8 | |
| $brine_5$ | 21.7 | 25.7 | 26.1 | 26.8 | 28.2 | 28.3 | |
| $product_5$ | 62.8 | 51.0 | 50.3 | 46.1 | 42.0 | 40.1 | |
| $brine_6$ | 20.5 | 23.6 | 25.1 | 26.8 | 27.7 | | |
| $product_6$ | 52.7 | 43.8 | 38.8 | 36.2 | 35.1 | | |
| $brine_7$ | 19.8 | 23.9 | 25.8 | 26.6 | 27.8 | | |
| $product_7$ | 57.7 | 49.5 | 46.5 | 42.4 | 38.0 | | |

It can be seen that all seven products were cooled to below 40° F. in less than 30 minutes, most in less than 25 minutes. During these tests it was not possible to maintain a constant brine temperature. Therefore, as the product temperature was lowered the brine temperature rose throughout each trial. It was evident that the rate of cooling decreased significantly as the difference between product and brine temperature decreased. In a commercial brine chiller, a more constant temperature can be maintained.

The invention has been described in detail with particular reference to specific embodiments, but it will be understood that variations and modifications can be effected within the spirit and scope of the invention.

What is claimed is:

1. A method comprising:

a) transferring a plurality of heat sealed pouches, the pouches containing a product having a temperature of between 100° F. and 212° F., to a tumbler chiller having refrigerated water as the cooling medium;

b) tumbling and cooling the pouches until the temperature of the product drops to between 50° F. and 70° F.;

c) transferring the cooled pouches to a cooling bath having a liquid cooling medium having a temperature lower than 32° F.; and d) moving the pouches through and in contact with the liquid cooling medium until the product temperature drops to between 30° F. and 50° F.

2. The method of claim 1 wherein the pouches are made in a form/fill/seal apparatus.

3. The method of claim 1 wherein the product has a temperature at the time of transfer of the pouches in step a), of between 140° F. and 210° F.

4. The method of claim 1 wherein the pouches are tumbled and cooled until the temperature of the product drops to between 55° F. and 65° F.

5. The method of claim 1 wherein the liquid cooling medium having a temperature lower than 32° F. is brine or glycol.

6. The method of claim 1 wherein the liquid cooling medium having a temperature lower than 32° F. has a temperature of 30° F. or less.

7. The method of claim 1 wherein the liquid cooling medium having a temperature lower than 32° F. is agitated.

8. The method of claim 1 wherein the pouches are moved through the liquid cooling medium until the product temperature drops to between 35° F. and 55° F.

9. The method of claim 1 wherein the tumbling of the pouches is stopped before the pouches are transferred to the cooling bath.

10. An apparatus comprising:

a) means for transferring a plurality of pouches, the pouches containing a product having a temperature of between 100° F. and 212° F., to a means for tumbling and cooling;

b) means for tumbling and cooling the pouches until the temperature of the product drops to between 50° F. and 70° F., said means having refrigerated water as the cooling medium;

c) means for transferring cooled pouches to a cooling bath which uses a liquid cooling medium having a temperature lower than 32° F.; and d) means for moving the pouches through the liquid cooling medium until the product temperature drops to between 30° F. and 50° F.

11. An apparatus comprising:

a) means for transferring a plurality of heat sealed pouches, the pouches containing a product having a temperature of between 100° F. and 212° F., to a means for tumbling and cooling;

b) means for tumbling and cooling the pouches until the temperature of the product drops to between 50° F. and 70° F., said means having refrigerated water as the cooling medium;

c) means for transferring cooled pouches to a cooling bath which uses a liquid cooling medium having a temperature lower than 32° F.; and d) means for moving the pouches through and in contact with the liquid cooling medium until the product temperature drops to between 30° F. and 50° F.

12. The apparatus of claim 11 wherein the liquid cooling medium having a temperature lower than 32° F. is brine or glycol.

13. The apparatus of claim 11 wherein the liquid cooling medium having a temperature lower than 32° F. has a temperature of 30° F. or less.

14. The apparatus of claim 10 wherein the means for transferring a plurality of pouches comprises a conveyor belt or chute.

15. The apparatus of claim 10 wherein the means for tumbling and cooling comprises a drum tumbler/chiller.

16. The apparatus of claim 10 wherein the means for tumbling and cooling comprises a rotary drum tumbler/chiller.

17. The apparatus of claim 10 wherein the means for transferring cooled pouches to a cooling bath comprises a conveyor belt or chute.

18. The apparatus of claim 10 wherein the cooling bath comprises a continuous cooling bath.

* * * * *